United States
Von Belvard

[11] 3,970,368
[45] July 20, 1976

[54] OPTICAL ZOOMING LENS
[75] Inventor: Peter Révy Von Belvárd, Vienna, Austria
[73] Assignees: Karl Vockenhuber; Raimund Hauser, Vienna, Austria
[22] Filed: June 3, 1974
[21] Appl. No.: 475,941

[30] Foreign Application Priority Data
June 14, 1973 Austria .................................... 5262/73

[52] U.S. Cl. ................................ 350/187; 350/186
[51] Int. Cl.² ............................................ G02B 15/00
[58] Field of Search ............................ 350/186, 187

[56] References Cited
UNITED STATES PATENTS

| | | | |
|---|---|---|---|
| 3,163,701 | 12/1964 | Staubach | 350/187 |
| 3,465,662 | 9/1969 | Kashiwase | 350/187 X |
| 3,613,544 | 10/1971 | Plihal et al. | 350/187 X |
| 3,731,987 | 5/1923 | Iida et al. | 350/187 |

Primary Examiner—John K. Corbin
Assistant Examiner—Conrad Clark
Attorney, Agent, or Firm—Ernest G. Montague; Karl F. Ross; Herbert Dubno

[57] ABSTRACT

A lens system for a camera comprises a pair of axially shiftable components for varying the focal length, coupled with a cylindrical zoom-control member, and a further axially shiftable component for changing the object distance, coupled with a cylindrical focusing-control member. An operating tube coaxial with the two control members engages the zoom-control member for rotating same, the focusing-control member being releasably entrainable by the zoom-control member between a limiting macro-range position and a close-up position through a deactivable coupling which may include two coacting lugs on these members or a pawl on the zoom-control member retractable by an axial shift of the operating tube. A toothed detent ring, nonrotatable but axially slidable, is also movable by that tube into engagement with the focusing-control member for arresting same against the force of a biasing spring urging that member into its limiting macro-range position.

11 Claims, 3 Drawing Figures

OPTICAL ZOOMING LENS

FIELD OF THE INVENTION

This invention relates to an optical system which may be designed for use in conjunction with a camera of the varifocal or zoom type.

STATE OF THE ART

Commonly owned U.S. Pat. No. 3,613,544 discloses an optical zoom lens system, such as a camera objective, with two independently adjustable range setters of differing effectiveness, one of which is associated with the normal range setting of the optical system while the other is associated with the macrophotographic range (referred to hereinafter as macro range), each of the two range setters co-operating with a different optical element of a zoom lens combination wherein the optical element which co-operates with the macro-range setter is resettable into a predetermined relative position with respect to the other optical element for the purpose of adjustments in the normal range.

OBJECTS OF THE INVENTION

An object of the invention is to improve the versatility of such a system by enabling the focal length to be adjusted even when the optical system is set to operate in the macro range, i.e. with focusing upon a relatively close object. This is not possible in the system described in the above-identified patent because of the rigid coupling between the two adjustable setting devices.

Another object of the invention is to provide an optical system having the versatility outlined above without the attendant disadvantage of requiring a multiplicity of operating devices which complicate the manipulation of the system and increase its cost.

SUMMARY OF THE INVENTION

I realize these objects, in accordance with my present invention, by the provision of two preferably coaxially cylindrical members for zooming and focusing purposes, respectively, i.e., a first control member coupled with first lens means for axially moving same to vary the focal length of the system and a second control member coupled with second lens means for axially moving same to shift the focal plane of the system between a normal range position and a macro-range or close-up position, in a manner well known per se, the two lens means being movable independently of each other. One of the control members, more specifically the first member in the embodiments described hereinafter, is engaged by operating means such as a rotatable coaxial tube while the other control member is entrainable by the former through a deactivable coupling facilitating axial movement of either of the two lens means by the operating means.

According to a more particular feature of my invention, the control member not engaged by the operating means — specifically the second member — is provided with biasing means such as a spring for urging same into a predetermined setting corresponding to the aforementioned normal-range position, that setting being defined by suitable stop means.

Pursuant to a further feature of my invention, the system includes deactivable detent means for arresting the second control member against its biasing force in a selected intermediate position between the normal-range position and the close-up or macro-range position. The detent means may be engaged by the operating tube for axial displacement into and out of a position of engagement with the associated control member.

The detactivable coupling for releasably interconnecting the two control members may comprise a pair of coacting formations on these members which come into play in a predetermined relative position thereof for unidirectionally entraining the second member by the first one against the biasing force. Alternatively, the coupling may include an element on the first member linked with the operating tube for selective engagement with and disengagement from a coacting formation on the second member.

BRIEF DESCRIPTION OF THE DRAWING

The invention will now be described in more detail, by way of example, with reference to the accompanying drawing in which.

Figure 1:
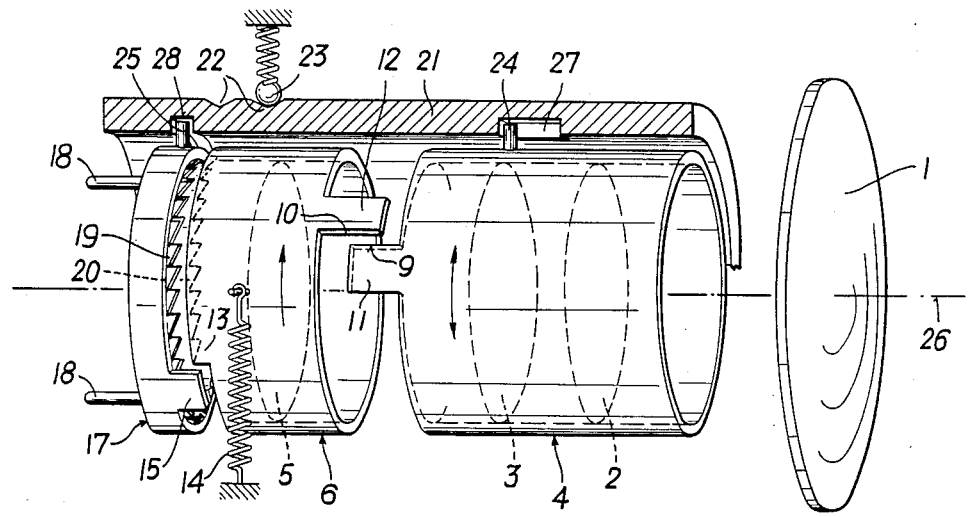
FIG. 1 is a schematic partially exploded perspective view of an optical system according to my invention, with parts broken away.

The optical system of FIG. 1 comprises a front element 1, indicated by a single lens, two further optical elements 2, 3 for adjusting the focal length, disposed in a control tube 4, and a basic objective indicated by a single lens 5. The basic objective 5 is adapted for range variation in the macro region and to this end is disposed in an adjustable camming tube 6. The front element 1 on the other hand is adapted in conventional manner for setting in the normal adjustment range.

Figure 2:
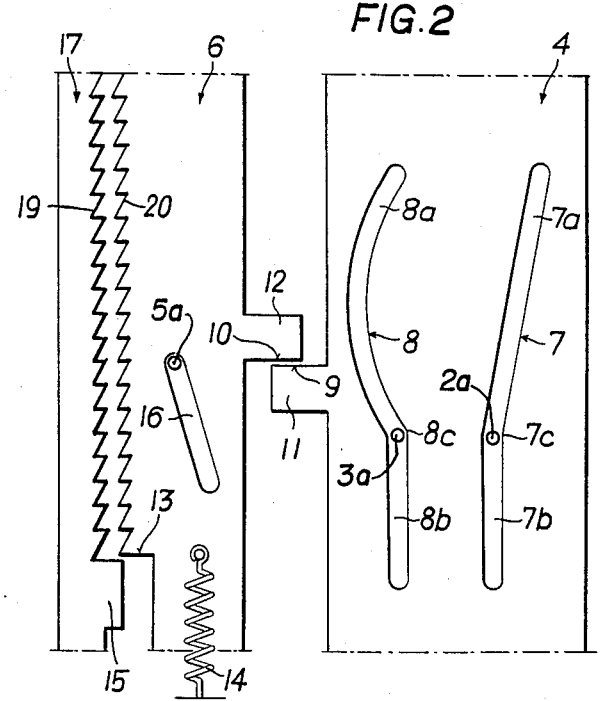
FIG. 2 is a developed surface view of parts of several coacting cylindrical members of the system shown in FIG. 1.

As may be seen by reference to FIG. 2, control tube 4 is provided with two cam slits 7, 8 with respective extremities 7a, or 8a for adjusting the focal length and other extremities 7b, and 8b which extend parallel to the direction of rotation of the tube 4 so that the optical elements 2, 3 are stationary with respect to each other and relative to the remaining optical elements 1, 5 as soon as the two cam extremities 7b, 8b come into play.

For as long as the cam extremities 7a, 8a control the two optical elements 2, 3 the control tube 4 will be freely rotatable without affecting the tube 6. The tubes 4, 6 are, however, provided with coupling edges 9, 10 which face each other and constitute a pair of coacting formations on two axially projecting lugs 11, 12 so that, beyond a certain range of rotation of the tube 4, the two edges 9, 10 abut each other whereby the cam tube 6 for the macro range is coupled with the control tube 4 for joint rotation when the cam-slit extremities 7b, 8b go into action.

On its image end, the cam tube 6 is provided with a shoulder 13 by means of which it bears upon a substantially stationary mating abutment 15 under the action of a spring 14 which is diagrammatically indicated. The abutment surfaces 9, 10, 13 and the lug 15 are so arranged that the two edges 9, 10 touch when projections 2a, 3a on the two optical elements 2, 3 are engaged by transition zones 7c, 8c between the extremities 7a, 7b and 8a, 8b of the slit extremities 7, 8.

The cam branches 7b, 8b assume control of the optical elements 2, 3 as soon as the coupling surfaces 9, 10 bear upon each other. Simultaneously the cam tube 6, for adjustment in the macro range, is entrained to co-rotate with the control tube 4. The cam tube 6 is provided with a cam slot 16 which positions the basic objective 5 via a projection 5a thereof.

Rotation of the focal-length-control tube 4 with legs 11, 12 engaging each other also entrains the cam tube 6 to reposition the objective 5 with resulting displacement of the focal plane of the system from its normal-range position while the optical elements 2, 3 remain stationary because of the transverse orientation of the slit extremities 7b, 8b with reference to the optical axis 26. The positioning of objective 5 is effected by a sliding of projection 5a along the slanting circumferential cam slot 16 as the tube 6 rotates. This sliding motion permits adjustment in the macro range.

If the control tube 4 for the focal length is subsequently rotated in the opposite direction, the cam tube 6 follows the motion under the biasing force of the spring 14 until its shoulder 13 again bears upon the abutment 15. This achieves a fading effect of the optical system as it enables the front element 1 to be preadjusted to a distant object whereupon the system can be focused onto a near object (close-up), for example a title, by means of the adjusting element 6 for the macro range, followed by focusing onto the distant, object by rotation of the control tube 4 until the shoulder 13 once again comes to rest on abutment 15 to re-establish the normal-range position of the focal plane.

The optical system described hereinabove is completely operative by itself and already offers the advantage of simplified handling because only a single operating element is required for adjusting the focal length and for obtaining adjustment in the macro range.

It is sometimes desirable to adjust the focal length in the marco range. FIG. 1 shows how this may be achieved with the aid of detent means designed to arrest the tube 6 against the action of the spring 14. The detent means comprises a ratchet ring 17 carrying the abutment 15. The detent member 17 is non-rotatable but axially slidable along pins 18 and its end face is provided with sawteeth 19 confronting mating ratchet teeth 20 which are provided on the opposite end face of the cam tube 6. Axial displacement of the ratchet ring 17 permits engagement between the sawteeth 19, 20 so that the cam tube 6 is secured against rotation.

A common operating tube 21, of which FIG. 1 shows a circumferential segment in perspective, is provided for turning the tube 4 and for axially sliding the ratchet ring 17. The operating tube 21 is thus not only rotatable but also axially slidable and has indexing means in the form of shallow grooves 22 which co-operate with ball checks 23. The ratchet ring 17 can therefore be retained in its selected axial position. The ring 17 and the tube 4 are provided with operating pins 24, 25; the pin 24 is disposed in a groove 27 inside the operating tube 21 extending parallel to the optical axis 26 of the optical system whereas the pin 25 engages in a peripheral groove 28. The operating tube 21 is therefore co-rotationally coupled with the tube 4 while being axially slidable relative to same and is rotatable with respect to the ratchet ring 17 but cannot slide axially with respect thereto.

With the illustrated embodiment it is possible to obtain a fading effect and to vary the focal length in the macro range. If additional fading is desired after adjusting the focal length, it is merely necessary to detach the sawteeth 19, 20 from each other whereupon the cam tube 6 returns into its starting position under the action of the spring 14 so that focusing of the optical system is determined simply by the setting of the front element 1.

Figure 3:
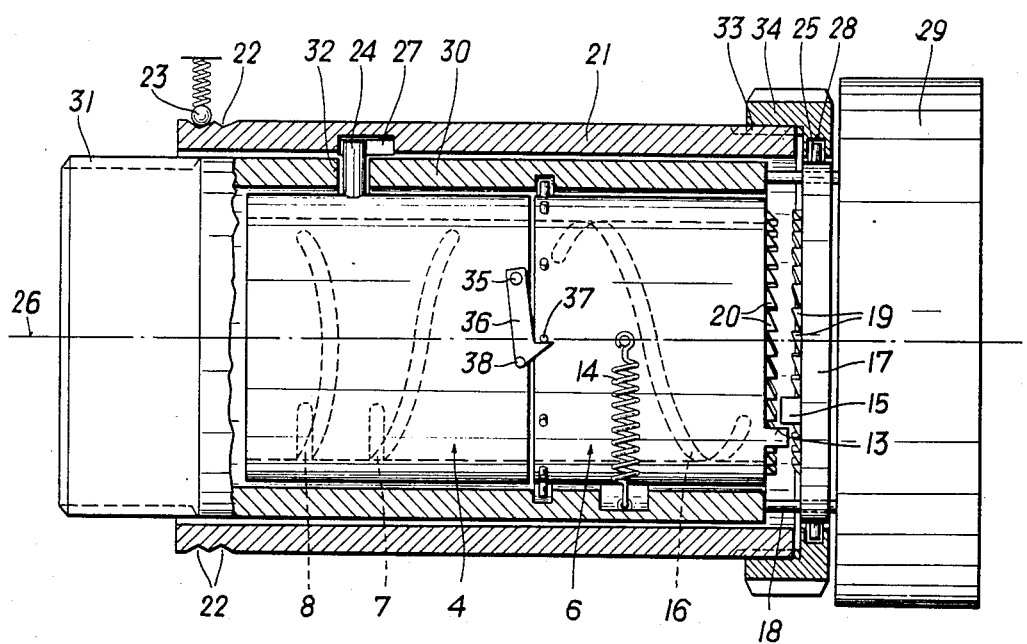
FIG. 3 is a side view, partially in section and partly broken away, of a modification of the optical system of FIG. 1.

The need for subsequent refocusing after adjustment of the focal length in the macro range can in some circumstances be a disadvantage. This is so if the optical system is to be used as a camera objective. This disadvantage can however be avoided if the optical element associated with the macro range (i.e., component 5) is disposed on the object side and not on the image side with respect to the optical elements 2, 3 which adjust the focal length. Difficulties are encountered in such an arrangement because the distances required for adjustment on this side are long. Fundamentally, however, the problem can be solved in this way, as illustrated in FIG. 3 showing an embodiment which is similar in many respects to that described above. Parts which have a like function have the same reference symbols and their functions are not redescribed. In the embodiment of FIG. 3 the tube 6 is disposed in front of the tube 4, i.e., on the object side thereof. The front element is divided into two lens components of which one is axially slidable over the normal adjusting range for focusing in conventional manner by means of a distance-setting ring 29. The other lens component is adjusted by the cam tube 6. The nonrotatable ratchet ring 17 is disposed between the adjusting ring 29 and the cam tube 6. The individual tubes are mounted in a tubular support 30 which is attached to the camera and is provided with screw threads 31 for connection purposes. On the image-side end, i.e., at left, the support 30 also carries the basic objective (not shown). The pin 24 passes through a slit 32 in the support 30 into the axially extending groove 27 of the operating tube 21. A separate ring 34, whose external circumference is provided with grooves or flutes, is screwed onto the operating tube by threads 33 of relatively steep pitch, the ring 34 being provided with the groove 28 accommodating the pin 25 of the ratchet ring 17 for axially displacing same.

Although the two cylindrical control members 4, 6 could be coupled to each other by the same arrangement as that shown in FIG. 1, a different form of coupling is shown in FIG. 3. A pawl 36, which can latch onto peripherally spaced pins 37 projecting radially from the cam tube 6 is pivotable on a stud 35 which is fixed on the focal-length-control tube 4. Other coupling formations can be provided in place of the pins 37 for unidirectionally effective coaction with the pawl 36. By providing a large number of pins 37 it is possible to couple the two cam tubes 4, 6 to each other in virtually any desired relative angular position of the tube 4 for joint rotation. For the coupling operation, the pawl 36 is provided with a pin 38 perpendicular to its swing plane, the pin 38 extending in the same way as the pin 24 through a slit in the support tube 30 to engage in a groove inside the operating tube 21. Sliding the operating tube 21 in the axial direction therefore not only shifts the ratchet ring 17 along the guide pins 18 but also swings the pawl 36 about its pivot 35 into and out of engagement with one of the pins 37. By suitable choice of the position of the ring 34 on the operating tube 21, the adjustment can be made so that disengagement of the coupling pawl 36 from the pins 37 is accompanied by interengagement of the mating sawteeth 19, 20 so that the cam tube 6 is immediately arrested. However, if it is desired to allow the return spring 14 to come into operation it is merely necessary to slightly unscrew the ring 34 so that the teeth 19, 20 are disengaged at the instant of uncoupling of tubes 4 and 6 from each other.

Numerous modifications of the described embodiments are possible within the scope of the invention; since the pins 37 must in any case be guided in a groove of the support tube 30, one of these pins may co-operate with a boundary wall of the groove which extends traversely to the direction of rotation of the tube 6 as a stop so that the abutments 13, 15 can be dispensed with. Furthermore, the pin 24 is not absolutely necessary if a coupling control pin 38 is provided inasmuch as pin 38 may perform both functions. Should the arrangement of the optical element associated with the macro range give rise to difficulties on the object side of the adjusting elements for the focal length it is also feasible to modify the embodiment according to FIG. 1 so that an optical element is provided in the zone of the basic objective 5 to perform a compensating motion dependent on the motion of the tube 4 in order to maintain a constant image position.

I claim:
1. A varifocal optical system focusable at different object distances, comprising:
    first and second lens means movable independently of each other along a common optical axis;
    zooming means including a first control member coupled with said first lens means via camming formations effective in one part of a range of displacement of said first control member for axially moving said first lens means to vary the focal length of the system, said camming formations being ineffectual in another part of said range;
    focusing means including a second control member coupled with said second lens means for axially moving same to shift the focal plane of the system between a normal-range position and a close-up position;
    operating means for displacing said first control member; and
    deactivable coupling means effective in said other part of said range for releasably interconnecting said control members to facilitate axial movement of said second lens means without said first lens means by said operating means.
2. A system as defined in claim 1, further comprising stop means engageable with said second control member and biasing means for urging said second control member into a predetermined setting defined by said stop means.
3. A system as defined in claim 2 wherein said predetermined setting corresponds to said normal-range position.
4. A system as defined in claim 3, further comprising deactivatable detent means for arresting said second control member in a selected close-up position, against the force of said biasing means.
5. A system as defined in claim 3 wherein said control members are cylindrically curved about said axis.
6. A system as defined in claim 5 wherein said coupling means comprises a pair of coacting formations on said control members unidirectionally effective for rotary entrainment of said second control member by said first control member, against the force of said biasing means, in a predetermined relative angular position thereof.
7. A system as defined in claim 6 wherein said coacting formations come into play in an engaging position of said first control member corresponding to a limiting axial position of said first lens means upon said second control member occupying said predetermined setting, said engaging position coinciding with the end of said one part of said range.
8. A system as defined in claim 3 wherein said operating means is a rotatable tube centered on said axis and axially shiftable therealong, said control members being axially fixed, further comprising a nonrotatable detent member axially shiftable by said tube for selective engagement with said second control member to arrest same in a selected intermediate position, between said normal-range position and said close-up position, against the force of said biasing means.
9. A system as defined in claim 8 wherein said coupling means comprises an element on said first control member linked with said tube for selective engagement with and disengagement from a coacting formation on said second control member by an axial shifting on said tube.
10. A system as defined in claim 9 wherein said detent member is adjustably mounted on said tube for selective displacement into and out of a position thereon in which said detent member becomes effective to arrest said second control member concurrently with the disengagement of said element from said coacting formation.
11. A system as defined in claim 1 wherein said second lens means is disposed on the object side of said first lens means.

* * * * *